US011235792B2

(12) United States Patent
Delgatty et al.

(10) Patent No.: US 11,235,792 B2
(45) Date of Patent: Feb. 1, 2022

(54) COMPACTIBLE WAGON

(71) Applicant: Urban Electric Co., Pasadena, CA (US)

(72) Inventors: Grant Delgatty, Pasadena, CA (US); Sven Etzelsberger, Pasadena, CA (US)

(73) Assignee: Urban Electric Co., Pasadena, CA (US)

( * ) Notice: Subject to any disclaimer, the term of this patent is extended or adjusted under 35 U.S.C. 154(b) by 0 days.

(21) Appl. No.: 16/284,857

(22) Filed: Feb. 25, 2019

(65) Prior Publication Data

US 2020/0031377 A1     Jan. 30, 2020

Related U.S. Application Data

(63) Continuation of application No. 15/485,027, filed on Apr. 11, 2017, now Pat. No. 10,214,230.

(60) Provisional application No. 62/359,089, filed on Jul. 6, 2016, provisional application No. 62/321,885, filed on Apr. 13, 2016.

(51) Int. Cl.
*B62B 3/02* (2006.01)
*B62B 3/00* (2006.01)

(52) U.S. Cl.
CPC .............. *B62B 3/022* (2013.01); *B62B 3/002* (2013.01); *B62B 3/007* (2013.01)

(58) Field of Classification Search
CPC ........... B62B 3/02; B62B 3/022; B62B 3/027; B62B 3/002; B62B 3/007; B62B 3/001; B62B 5/06; B62B 5/067; B62B 2202/52; B62B 2205/26; B62B 2206/02
See application file for complete search history.

(56) References Cited

U.S. PATENT DOCUMENTS

| 543,020 A | * | 7/1895 | Holmes ................. D06F 57/08 |
| 2,563,995 A |  | 8/1951 | East |
| 2,564,939 A |  | 8/1951 | Weast |
| 3,047,305 A | * | 7/1962 | Kleinschmidt ......... B62B 3/108 280/651 |

(Continued)

FOREIGN PATENT DOCUMENTS

| CN | 306511226 S | 5/2021 |
| EM | 008129761-0001 | 8/2020 |
| WO | 2020206163 A1 | 10/2020 |

OTHER PUBLICATIONS

International Search Report and Written Opinion for International Application No. PCT/US2020/026447, Search completed May 28, 2020, dated Jun. 15, 2020, 15 Pgs.

*Primary Examiner* — Frank B Vanaman
(74) *Attorney, Agent, or Firm* — KPPB LLP

(57) ABSTRACT

Compactible wagons are provided having at least two operational configurations. The compactible wagon has a first unfolded configuration where the first and second set of wheels are spaced apart by a horizontal platform and at least a second compacted configuration where the horizontal platform is folded into a vertical configuration and the first and second set of wheels are disposed next to each other. The compactible wagon can have one or more additional configurations, including extended configuration where one or more additional sections are positioned to extend the surface area of the horizontal platform of the wagon. Many different rigid and flexible sidewalls may be used with the wagon.

12 Claims, 15 Drawing Sheets

(56) References Cited

U.S. PATENT DOCUMENTS

| | | | |
|---|---|---|---|
| 3,305,243 A | 2/1967 | Manfredi, Jr. et al. | |
| 3,407,959 A * | 10/1968 | Mondineu | B62B 3/02 220/6 |
| 4,199,170 A * | 4/1980 | Hubner | B62B 3/02 280/641 |
| 4,326,731 A * | 4/1982 | Woychio | B62B 3/02 211/198 |
| 4,505,495 A | 3/1985 | Foss et al. | |
| 4,763,907 A * | 8/1988 | Raymond | B62B 3/02 280/47.315 |
| 4,878,682 A * | 11/1989 | Lee | B62B 3/025 280/42 |
| 4,887,836 A | 12/1989 | Simjian | |
| 5,318,312 A * | 6/1994 | Montemayor | B62B 5/0083 280/30 |
| 5,915,723 A | 6/1999 | Austin | |
| 6,079,777 A | 6/2000 | Simmons et al. | |
| 7,097,182 B1 | 8/2006 | Liu | |
| 8,453,771 B1 * | 6/2013 | Hirschfeld | B60L 8/003 180/65.1 |
| D698,699 S | 2/2014 | Dempsey et al. | |
| D698,701 S | 2/2014 | Dempsey et al. | |
| D706,684 S | 6/2014 | Dempsey et al. | |
| D710,262 S | 8/2014 | Faye | |
| 8,820,777 B1 * | 9/2014 | Pargansky | B62B 3/022 280/651 |
| 8,973,940 B2 | 3/2015 | Chen et al. | |
| D733,005 S | 6/2015 | Erwin | |
| 9,226,574 B1 | 1/2016 | Chen | |
| 9,227,687 B2 | 1/2016 | Delgatty et al. | |
| D760,122 S | 6/2016 | Guidry | |
| D761,160 S | 7/2016 | Duros et al. | |
| D779,380 S | 2/2017 | Van Den Berg | |
| 9,694,868 B2 | 7/2017 | Delgatty et al. | |
| D793,911 S | 8/2017 | Yim et al. | |
| 9,731,779 B2 * | 8/2017 | Lamb | B62D 51/005 |
| D803,102 S | 11/2017 | Pletcher | |
| 9,873,476 B2 | 1/2018 | Etzelsberger et al. | |
| 9,969,227 B1 | 5/2018 | Mcneave | |
| 10,214,230 B2 | 2/2019 | Delgatty et al. | |
| D860,869 S | 9/2019 | Moore et al. | |
| D864,032 S | 10/2019 | Bernard | |
| D902,082 S | 11/2020 | Sweeney | |
| 2008/0073880 A1 | 3/2008 | Bess | |
| 2011/0025005 A1 | 2/2011 | Howell | |
| 2011/0068072 A1 | 3/2011 | Zhu et al. | |
| 2011/0204598 A1 * | 8/2011 | Stevenson | B62B 3/02 280/639 |
| 2014/0284902 A1 | 9/2014 | Noy | |
| 2015/0035258 A1 | 2/2015 | Chen et al. | |
| 2015/0118006 A1 | 4/2015 | Wallace-Riley | |
| 2016/0121943 A1 | 5/2016 | Lamb | |
| 2017/0066463 A1 | 3/2017 | Wang et al. | |
| 2017/0259838 A1 * | 9/2017 | Choi | B62B 3/007 |
| 2017/0297598 A1 | 10/2017 | Delgatty et al. | |
| 2018/0263367 A1 | 9/2018 | Kuffel | |

\* cited by examiner

COMPACTIBLE WAGON

PRIORITY STATEMENT

The present application is a continuation of U.S. application Ser. No. 15/485,027, filed Apr. 11, 2017, which claims priority to U.S. Provisional App. No. 62/321,885, filed Apr. 13, 2016, and U.S. Provisional App. No. 62/359,089, filed Jul. 6, 2016, the disclosures of which are incorporated herein by reference.

FIELD OF THE INVENTION

The present invention relates to compactible wagons, and more particularly to compactible wagons having foldable sidewalls.

BACKGROUND OF THE INVENTION

Compactible wagons, i.e., wagons that can be folded and unfolded between open and collapsed configurations are well-known. However, the frames of such folding wagons tend to be relatively complex to operate. Specifically, most such compactible wagons rely on many rigid elements that bridge the foldable sections, and which severely limit the possible configurations of the wagon, i.e., providing only one folded and one unfolded configuration. In addition, most compactible wagons do not have the option of incorporating solid side walls, either relying on frame elements to contain goods disposed within, or providing soft cloth sidewalls that are unsuitable for hauling many types of loads. Accordingly, compactible wagons that overcome these and other disadvantages would be desirable.

SUMMARY OF THE INVENTION

Embodiments are directed to a compactible wagon having more than two operational configurations.

Various embodiments are directed to a compactible wagon including:
- a platform having first and second ends and upper and lower surfaces and defining a platform width, a platform length and a longitudinal axis at either end of which are disposed the first and second ends of the platform, and where the platform is further comprised of at least two pivotably interconnected independent sections, at least one section being disposed proximal the first end and at least one section being disposed proximal the second end;
- at least two sets of wheels disposed below the lower surface of the platform, at least one set being disposed on each of at least the two independent sections proximal the first and second ends, and each set of wheels comprising at least one wheel;
- at least a first support wall being disposed at the first end, and at least a second support wall being disposed at the second end, and wherein each of the support walls are pivotably interconnected to the platform;
- at least two sidewalls configured to span longitudinally between the first and second support walls and form a partially enclosed volume above the platform, the sidewalls being further configured to fold such that in a compacted position no dimension of each of the sidewalls is greater than the width of the platform;
- wherein the independent sections of the platform are pivotable about a horizontal axis arranged perpendicular to the longitudinal axis between an unfolded position where the independent sections form a platform having a horizontally planar configuration, and a folded position where the independent sections are disposed vertically adjacent one another and concomitantly the at least two sets of wheels are drawn closer together; and
- wherein the first and second support walls are each pivotable about a separate horizontal axis arranged perpendicular to the longitudinal axis along an arc that runs between a first position wherein each of the support walls overlap a portion of the upper surface of the platform, a second position wherein each of the support walls are aligned vertically, and a third position wherein each of the support walls are disposed within the horizontal plane of the platform when the platform is disposed in the horizontally planar configuration such that the platform length is increased.

In other embodiments the independent sections of the platform are pivotably interconnected at the midpoint of the platform length.

In still other embodiments there is further provided at least one support element disposed at the first and second ends of the platform such that the first and second support walls are prevented from rotating beyond the horizontal plane of the platform when disposed in the horizontally planar configuration.

In yet other embodiments there is further provided at least two support brackets configured to rigidly interconnect each of the first and second support walls in the second position. In some such embodiments the at least two support brackets are disconnectable from the first and second support walls and secured in line with the horizontal plane of the platform.

In still yet other embodiments the two sets of wheels overlap when the platform is disposed in the folded position.

In still yet other embodiments at least one set of wheels is rotatable about a vertical axis perpendicular to the longitudinal axis of the platform. In some such embodiments there is further provided a handle interconnected to the at least one set of wheels that is rotatable about the vertical axis.

In still yet other embodiments the sidewalls are formed of a pliable material selected from the group consisting of cloth, plastic and netting.

In still yet other embodiments the sidewalls are formed of a rigid material. In some such embodiments each of the sidewalls are formed of a pair of foldable panels, wherein a first of the pair of foldable panels of each sidewall is pivotably interconnected to the first support wall, and a second of the pair of foldable panels of each sidewall is pivotably interconnected to the second support wall. In other such embodiments each of the foldable panels is pivotable about a vertical axis disposed perpendicular to the longitudinal axis of the platform and disposed at a lateral edge of one of the support walls, such that the foldable panels may be folded and pivoted to overlap said one of the support walls. In still other such embodiments each of the foldable panels is configured to span between the first and second support walls, and is formed of at least two independent sections pivotably interconnected such that the panels are foldable such that in a folded configuration no dimension of any section is greater than the platform width. In yet other such embodiment at least one of the foldable panels of each sidewall further comprises an interconnecting flap configured to fold over at least one longitudinal edge of the other foldable panel of the sidewall to secure the two foldable panels of the sidewall together. In still yet other such embodiments the foldable panels further comprise anchors configured to cooperatively engage to secure the interconnecting flap to the longitudinal edge. In still yet other such embodiments the foldable panels of each of the sidewalls are configured such that, when interconnected, the sidewalls anchor the first and second support walls in the second position.

In still yet other embodiments each of the sidewalls is formed of a rigid removable foldable panel. In some such embodiments each of the rigid removable foldable panels is configured to span between the first and second support walls, and is formed of at least two independent sections pivotably interconnected such that the panels are foldable such that in a folded configuration no dimension of any section is greater than the platform width. In other such embodiments the foldable panels further comprise anchors configured to engage with cooperative anchors disposed on at least the support walls and the platform to secure the sidewalls to the wagon.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein.

DETAILED DISCLOSURE

The embodiments of the invention described herein are not intended to be exhaustive or to limit the invention to precise forms disclosed. Rather, the embodiments selected for description have been chosen to enable one skilled in the art to practice the invention.

Turning now to the drawings, compactible wagons are provided having at least two operational configurations. In many such embodiments the compactible wagon has a first unfolded configuration where the first and second set of wheels are space apart by a horizontal platform, and where the wagon has one or more sidewalls, and at least a second compacted configuration where the horizontal platform is folded into a vertical configuration and the first and second set of wheels are disposed next to each other. In various other embodiments, the sets of wheels are at least partially overlapping in the compacted configuration. In some other embodiments the compactible wagon can have one or more additional configurations, including at least an unfolded configuration without sidewalls and/or an extended configuration where one or more of the sidewall are disposed to extend the surface area of the horizontal platform of the wagon. In embodiments, many different rigid and flexible sidewalls may be used with the wagon.

Figure 1:
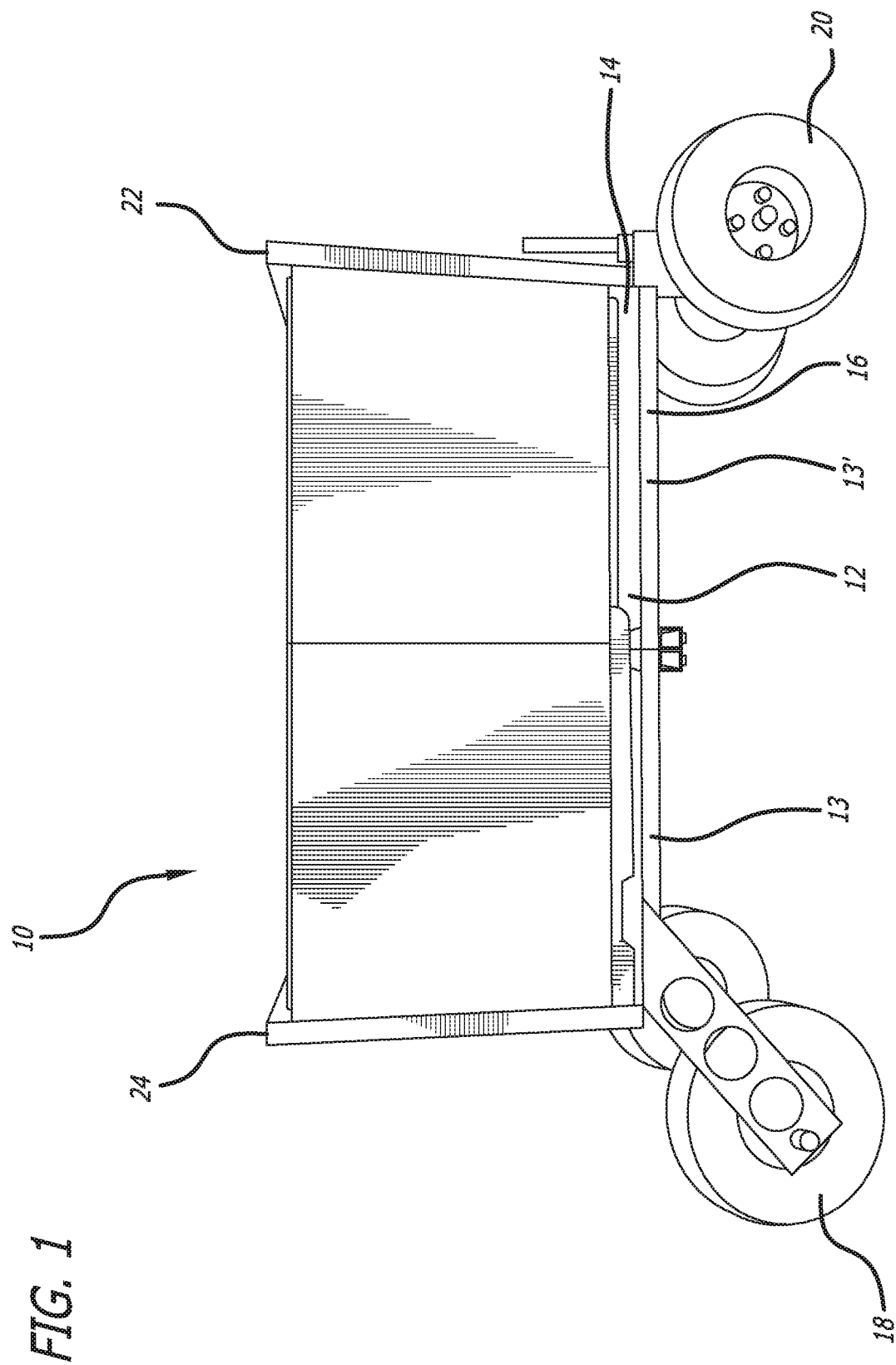
FIG. 1 provides a side view of a compactible wagon in a full unfolded configuration in accordance with embodiments.
Figure 2:
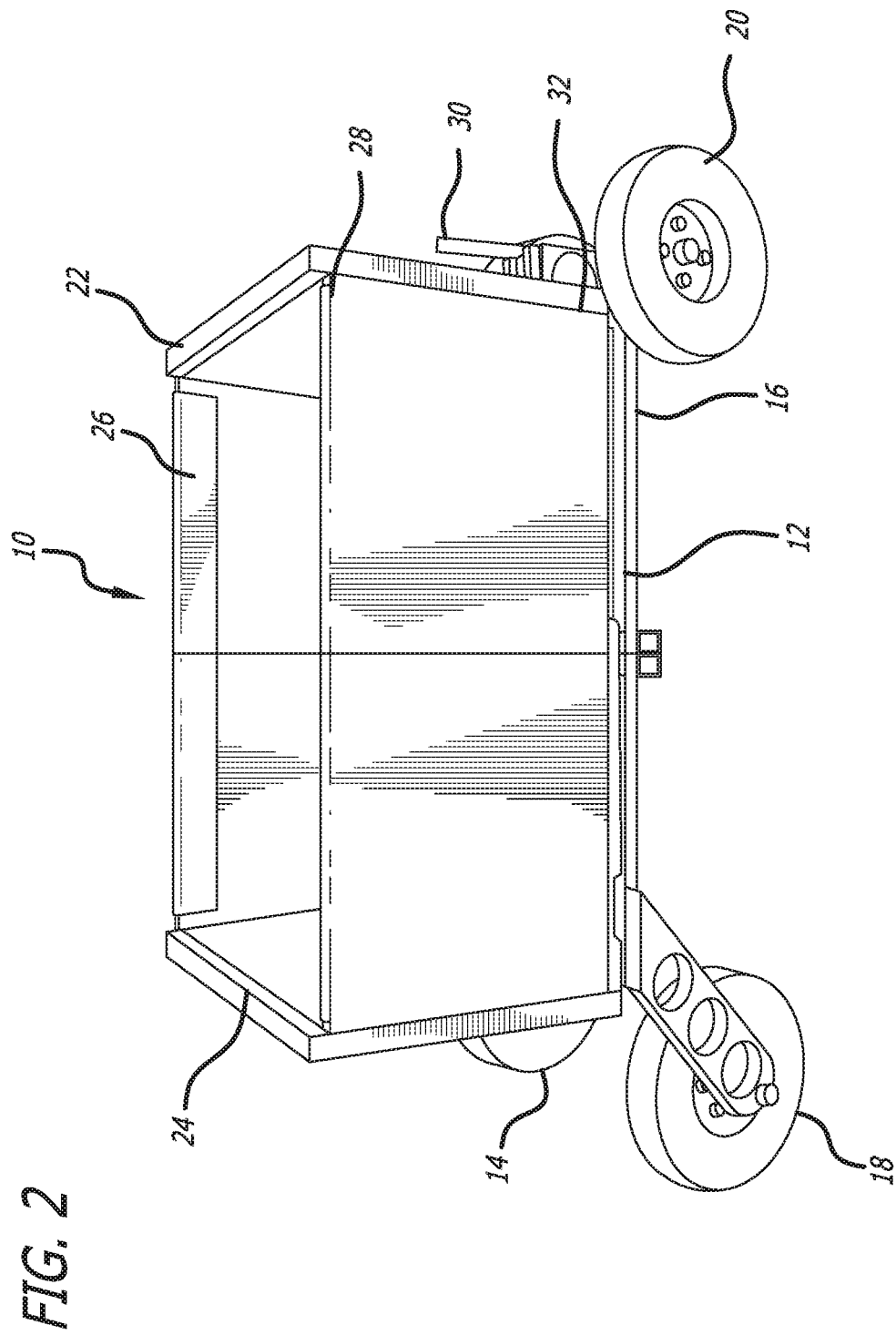
FIG. 2 provides a perspective view of a compactible wagon in a full unfolded configuration in accordance with embodiments.

As show in FIGS. 1 and 2, in many embodiments the compactible wagons (10) are comprised of a platform structure (12) having upper (14) and lower (16) surfaces, and at least two sets of wheels (18 & 20) are disposed along the lower surface of the platform structure. In many embodiments, the platform structure is formed of at least two sections (13 & 13') pivotably interconnect between each other such that the platform structure may be configured as either a flat horizontal plane or a pair of vertical walls. Although two sets of two wheels are shown in FIGS. 1 and 2, it will be understood that any number of sets of wheel comprising any number of wheels may be disposed across the platform to provide stability to the wagon, and each of the sections of the wagon platform and provide it with the capability to move via rotary motion of the wheel sets. In many such embodiments the rear and front sets of wheels are offset relative to each other by a sufficient amount to provide stability to the wagon. In some such embodiments the sets of wheels are disposed proximal to opposite ends of the horizontal platform. In various such embodiments the front pair of wheels further comprise a handle (30) mechanically interconnected thereto. In some such embodiments one or both of the sets of wheels are pivotable about an axis perpendicular to the longitudinal axis of the horizontal platform of the wagon, such that the direction of the sets of wheels may be controlled.

In various embodiments, as shown in the figures, the wagon further comprises front and rear support walls (22 & 24) disposed at either end of the upper surface (14) of the platform structure (12). Although the front and rear support walls are shown as unitary constructs, it should be understood that the support walls may be formed of multiple segment of any desired length and height provided the support walls provide stable anchor points for the sidewalls.

In some such embodiments, a pair of sidewall structures (26 & 28) spans between the front and rear sidewalls along the lateral edges (32) of the horizontal platform. In various embodiments, the sidewalls may be configured to both define an open volume above the wagon platform, and also to support the front and rear sidewalls to maintain them in an upright orientation, and prevent their rotation relative to the wagon platform.

Figure 3:
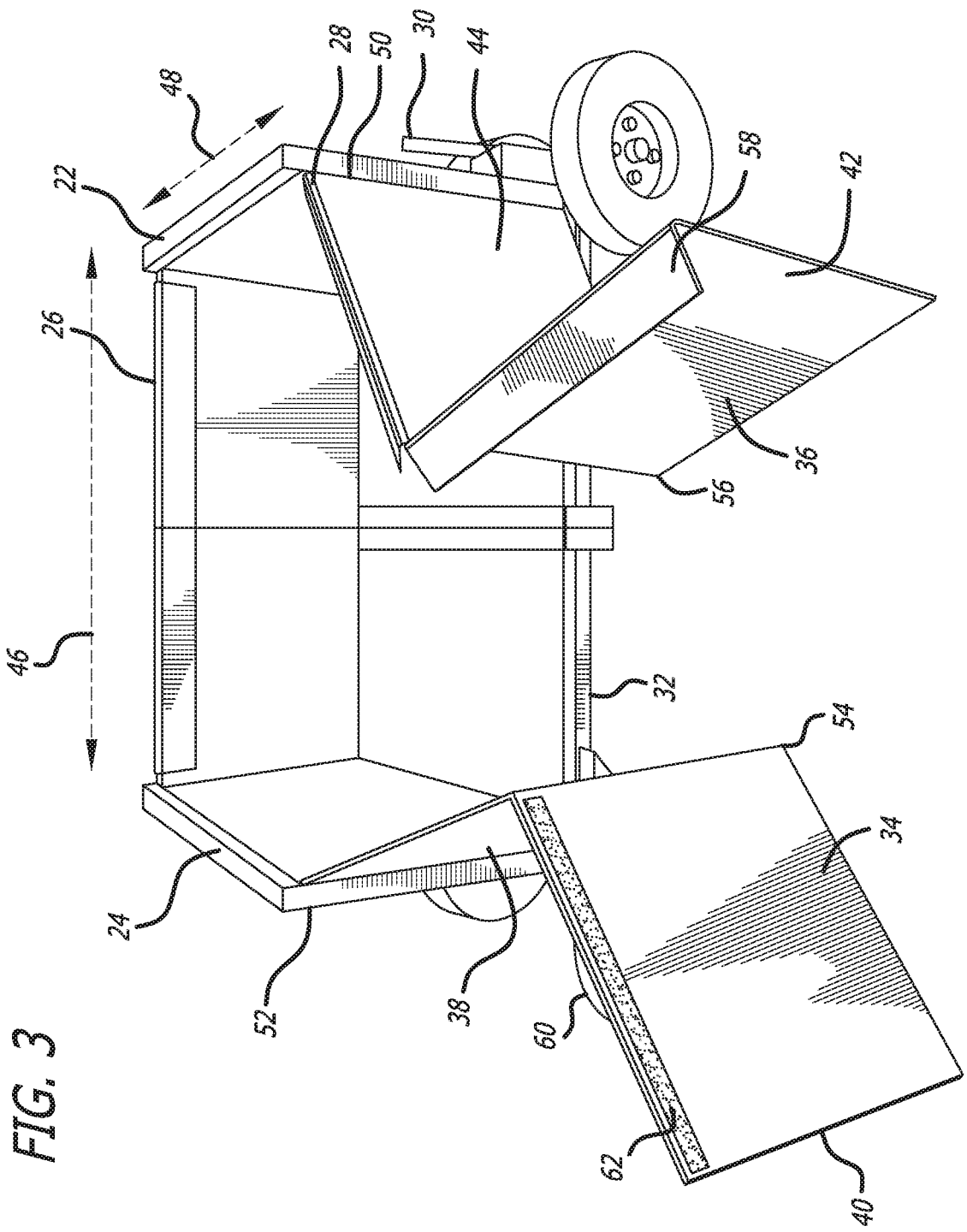
FIG. 3 provides a perspective view of a compactible wagon with one sidewall opened in accordance with embodiments.

As shown in FIG. 3, in many embodiments the sidewalls (26 & 28) of the compactible wagon are each made of a rigid material and comprise a plurality of foldable panels (34 & 36), each panel having multiple sections and (38 & 40) & (42 & 44). In some embodiments, as shown in FIG. 3, the sidewall panels (34 & 36) are each configured to separately span the length (46) of the horizontal platform in a first unfolded configuration, and that are foldable in sections (38, 40, 42 & 44) such that the sections have no dimension greater than the width (48) of the horizontal platform (12) in the folded configuration. In many such embodiments, when the sidewalls (26 & 28) are fully extended, each of the panels (34 & 36) span between the front (22) and rear (24) support walls, and each of the foldable panels (34 & 36) on each side of the wagon overlap such that the combination of the two panels form the complete side wall (28).

In many embodiments, for each sidewall (26 & 28) of the wagon (10), one of the two sections (38, 40, 42 & 44) of one of the panels (34 & 36) is pivotably attached (50 & 52) to the rear support wall (24), and the other is pivotably attached to the front support wall (22). In various embodiments each of the panels (34 & 36) are further hinged or foldable (54 & 56) at least once along their length such that the overall length of each of the panels (34 & 36) is compactible into a width at least no wider than the width of the platform. In such embodiments, the hinge point (54 & 56) along the length of the panels (34 & 36) of each sidewall (26 & 28) are positioned such that they do not overlap.

Although the sidewalls are shown as being formed of two panels, each formed of two sections, it should be understood that any number of panels and sections may be used such that the sidewalls are capable of spanning the distance between the front and rear walls, and foldable such that no dimension of the folded sidewall is longer than the width of the wagon platform.

In many embodiments at least one of the panels (34 & 36) further comprises at least one foldable lip (58) disposed along the upper edge thereof, the foldable lip being configured such that when the panels are extended across the front and rear support walls and positioned adjacent each other the foldable lip extends over the upper edge (60) of the other panel thus containing the upper edge thereunder. In various embodiments the panels further comprise cooperative fasteners (62) that can be releasably engaged together when the panels are configured to extend between the front and rear support walls. In some such embodiments at least one of the set of fasteners is disposed along the foldable lip. In various embodiments the fastener may be chosen from the group consisting of hook and loop, buttons, snaps, zippers, etc.

Figure 4:
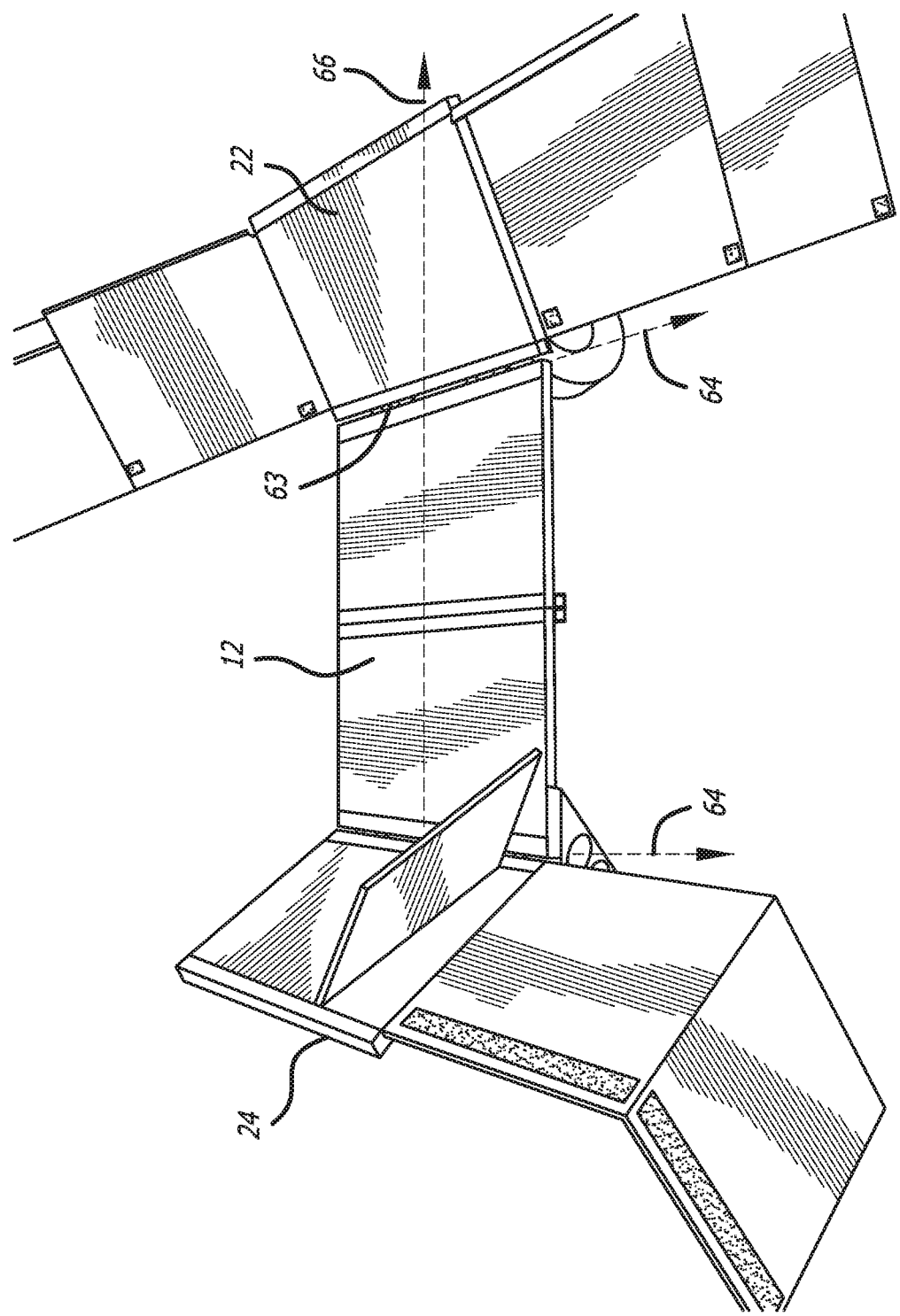
FIG. 4 provides a perspective view of a compactible wagon with both sets of sidewalls opened in accordance with embodiments.

As shown in FIG. 4, in various embodiments the front (22) and rear (24) support walls are also hinged (63) so that they are pivotable relative to the wagon platform (12) along axes (64) disposed horizontally perpendicular to the longitudinal axis (66) of the wagon platform (12) through at least a 180 degree arc. In many embodiments, the front and rear support walls may be folded in at least a 90 degree arc outward away from the central point of the wagon platform, thus extending the longitudinal length (46) of wagon platform.

Figure 5:
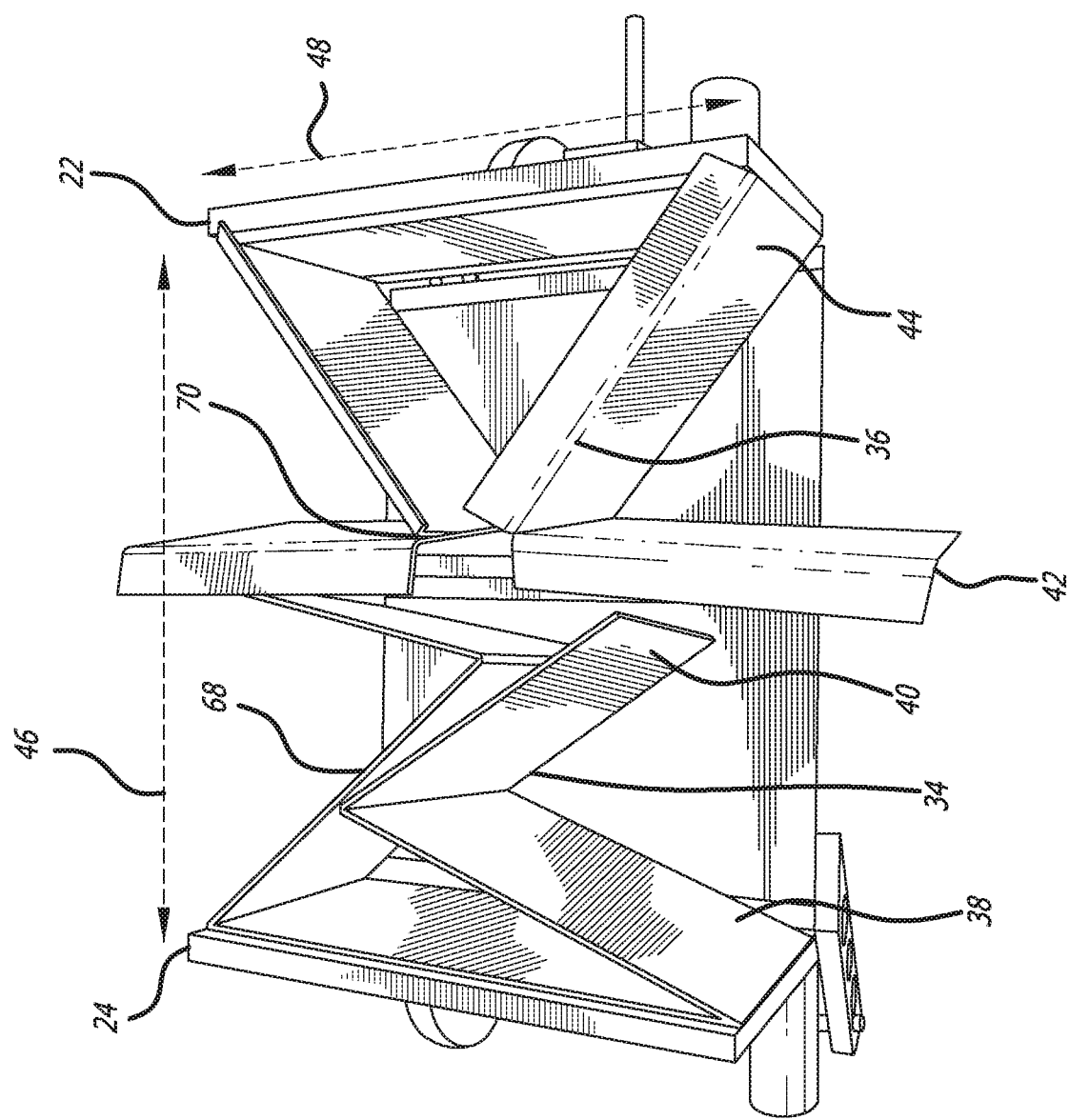
FIG. 5 provides a top view of a compactible wagon with both sets of sidewalls partially compacted in accordance with embodiments.

As shown in FIG. 5, the various embodiments the panels (34 & 36) and (68 & 70) of the sidewalls (26 & 28) are hinged or foldable both in relation to the support wall (22 & 24) to which it is attached and along its length into sections (38, 40, 42 & 44) such that at least the panels attached to each support wall fold flat together and nest against said support wall such that the panels do not extend beyond the width (48) of the wagon platform (12).

Figure 6:
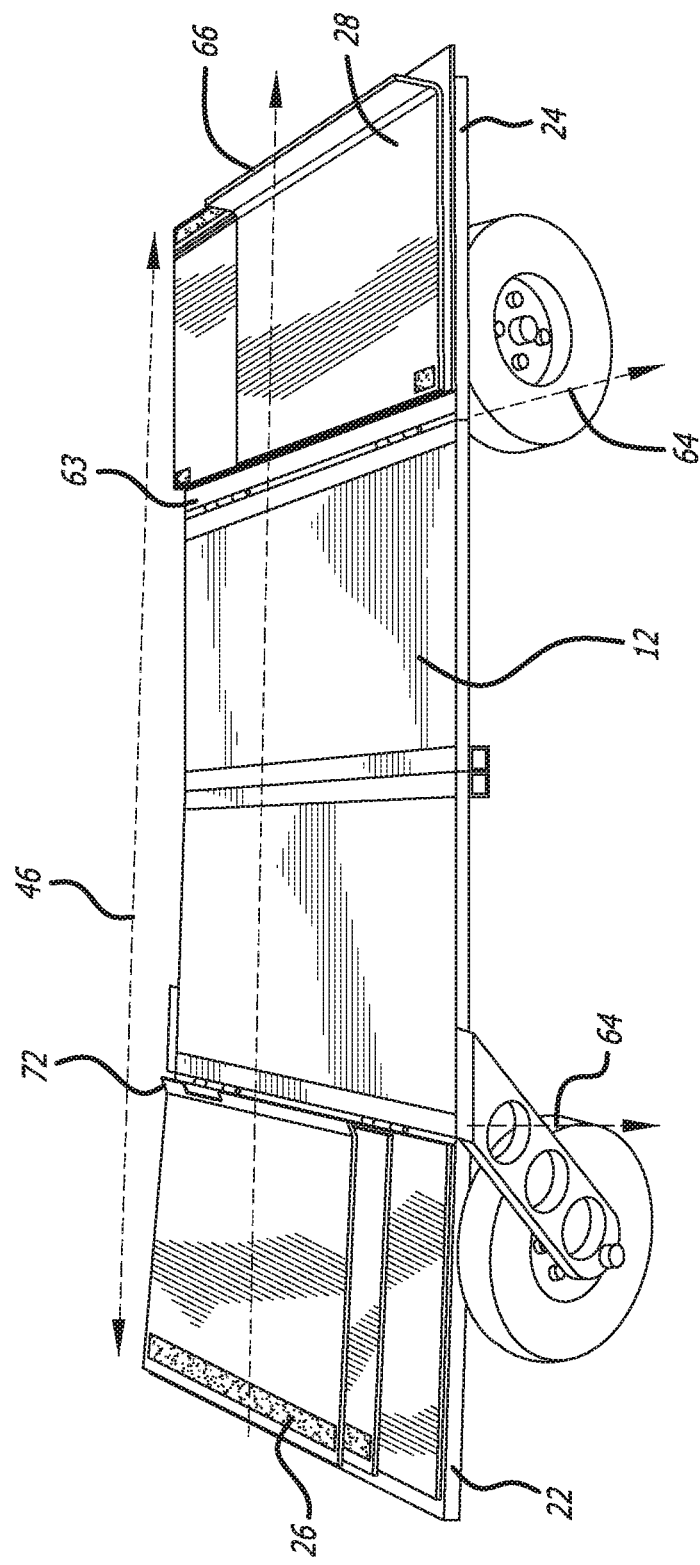
FIG. 6 provides a perspective view of a compactible wagon in a full flattened configuration in accordance with embodiments.

As shown in FIG. 6, when the sidewalls (26 & 28) are folded flat against the relevant support walls (22 & 24), the support walls can be pivoted outward through at least an arc of 180 degree about axes (64) to lie along longitudinal axis (66) of the wagon, within the plane of the horizontal platform (12) thus extending the longitudinal length (46) of the wagon platform. Elements may be provided to support the support walls (22 & 24) in this extended configuration thus allowing for the support walls to support weight disposed thereatop. In many embodiments, the support may take the form of a support bar (72) disposed along the lower edge of the support wall where it is hingedly connected to the wagon platform such that when rotated outward away from the center of the wagon platform the support bar on the support wall engages a cooperative support bar disposed on the end of the wagon platform. In other embodiments the support may be a bracket or strap connected to the platform to provide physical support between the platform and the support walls.

Figure 7:
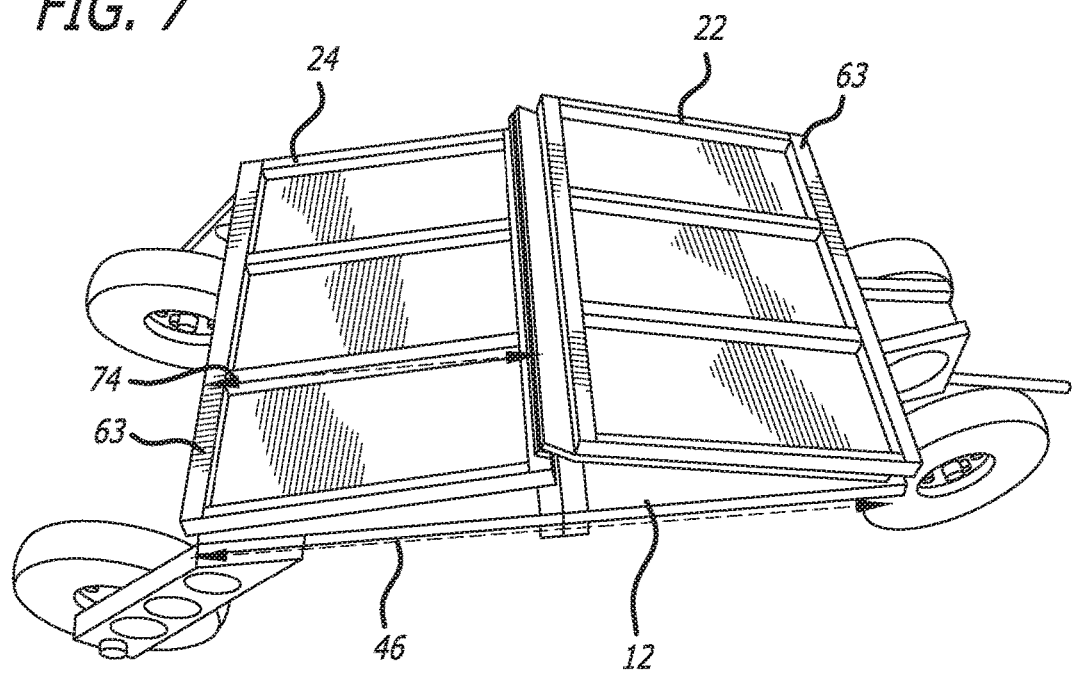
FIG. 7 provides a perspective view of a compactible wagon in a shortened configuration in accordance with embodiments.
Figure 8:
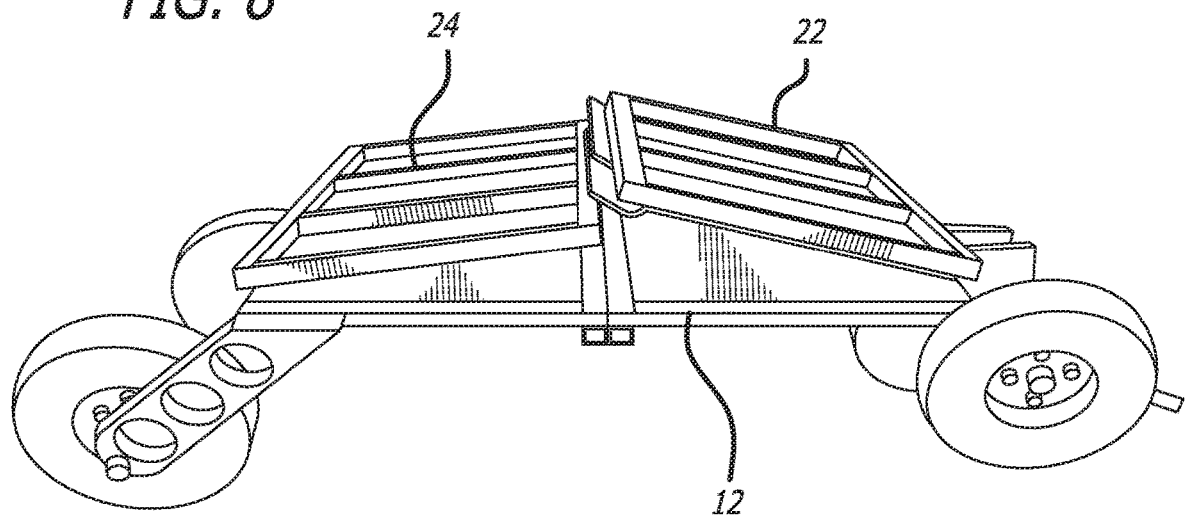
FIG. 8 provides a side view of a compactible wagon in a shortened configuration in accordance with embodiments.

As shown in FIG. 7, in many embodiments the support walls (22 & 24) are configured to each have a length (74) that is half of the length (46) of the wagon platform, and to be pivotably connected (63) with the wagon platform (12) to further allow the support walls to be rotated inward toward the center of the wagon platform such that the inner face of the support walls fold flat against the upper surface of the wagon platform forming a shortened configuration. As shown in FIG. 8, in this shortened configuration the outer surface of the support walls (22 & 24) form the upper surface of the wagon platform (12) upon which loads can be disposed.

Figure 9:
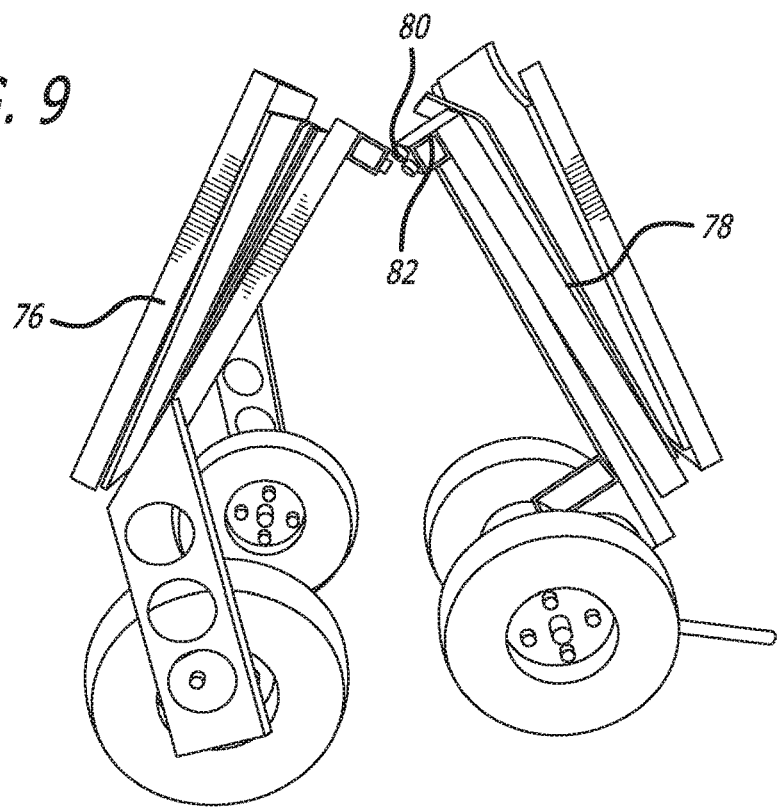
FIG. 9 provides a side view of a compactible wagon in a partially compacted configuration in accordance with embodiments.

As shown in FIG. 9, in many embodiments the wagon platform (12) is formed of two sections that are pivotably joined such that the platform is divided into two platform panels (76 & 78). In many embodiments, the hinged platforms pivot relative to each other such that the lower surfaces of the platform panels are disposed adjacent each other when in a folded configuration. Although any suitable pivot point may be used, as shown in the figure, in many embodiments the hinge point (80) of the platform panels is disposed at the midpoint of the platform below the wagon platform such that the edges of each of the platform panels. In many embodiments, at least one additional support bar (82) is disposed beneath the platform surface (12) and cooperatively engage in the unfolded extended position to prevent the rotation of the panels (76 & 78) downward beyond the point of planarity thus providing structural support when a load is deposited onto the upper surface of the wagon platform.

Figure 10:
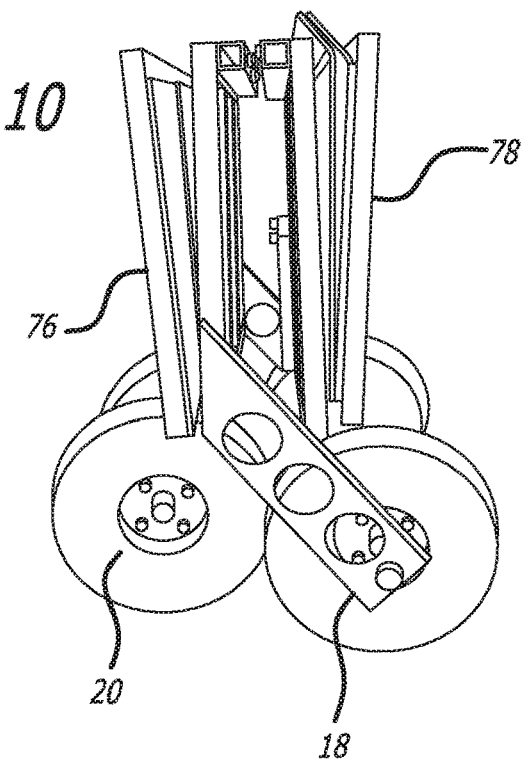
FIG. 10 provides a side view of a compactible wagon in a fully compacted configuration in accordance with embodiments.
Figure 11:
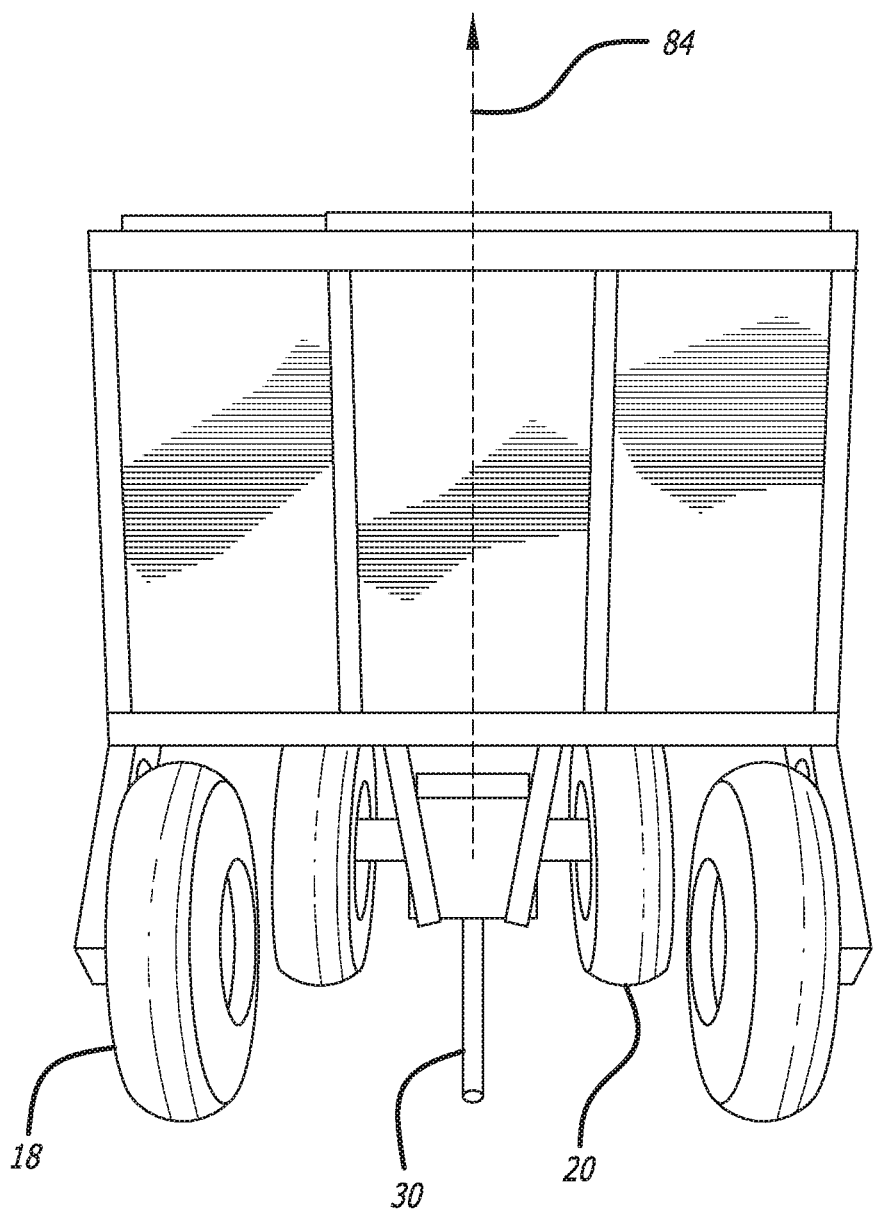
FIG. 11 provides a rear view of a compactible wagon in a fully compacted configuration in accordance with embodiments.

As shown in FIG. 10, in many embodiments the two platform panels (76 & 78) may be pivoted relative to each other into a compacted position in which the lower surfaces of the platform panels are disposed adjacent. As shown, in this compacted configuration, the front and rear wheels (18 & 20) may partially overlap. In many embodiments, as shown in FIG. 11, the pairs of front and rear wheels are configured to nest, one pair within the other such that the wheels do not interfere one with the other in such compacted configuration. Although not shown in the photos, to prevent the wagon from unfolding uncontrollably a retaining mechanism, such as a lock, clasp, or retaining strap may be incorporated into the wagon to secure the two panels of the platform from moving relative to each other once locked. As also shown, in many embodiments at least the front wheel pair is rotatably mounted about an axis (84) vertically perpendicular to the longitudinal axis of the wagon such that the position of the wagon handle (30) and the wheels in turn may also be rotated relative to the longitudinal axis of the wagon platform. In many embodiments, the wagon handle may be rotated at least 180 degrees such that the handle extends beneath the wagon platform.

Figure 12:
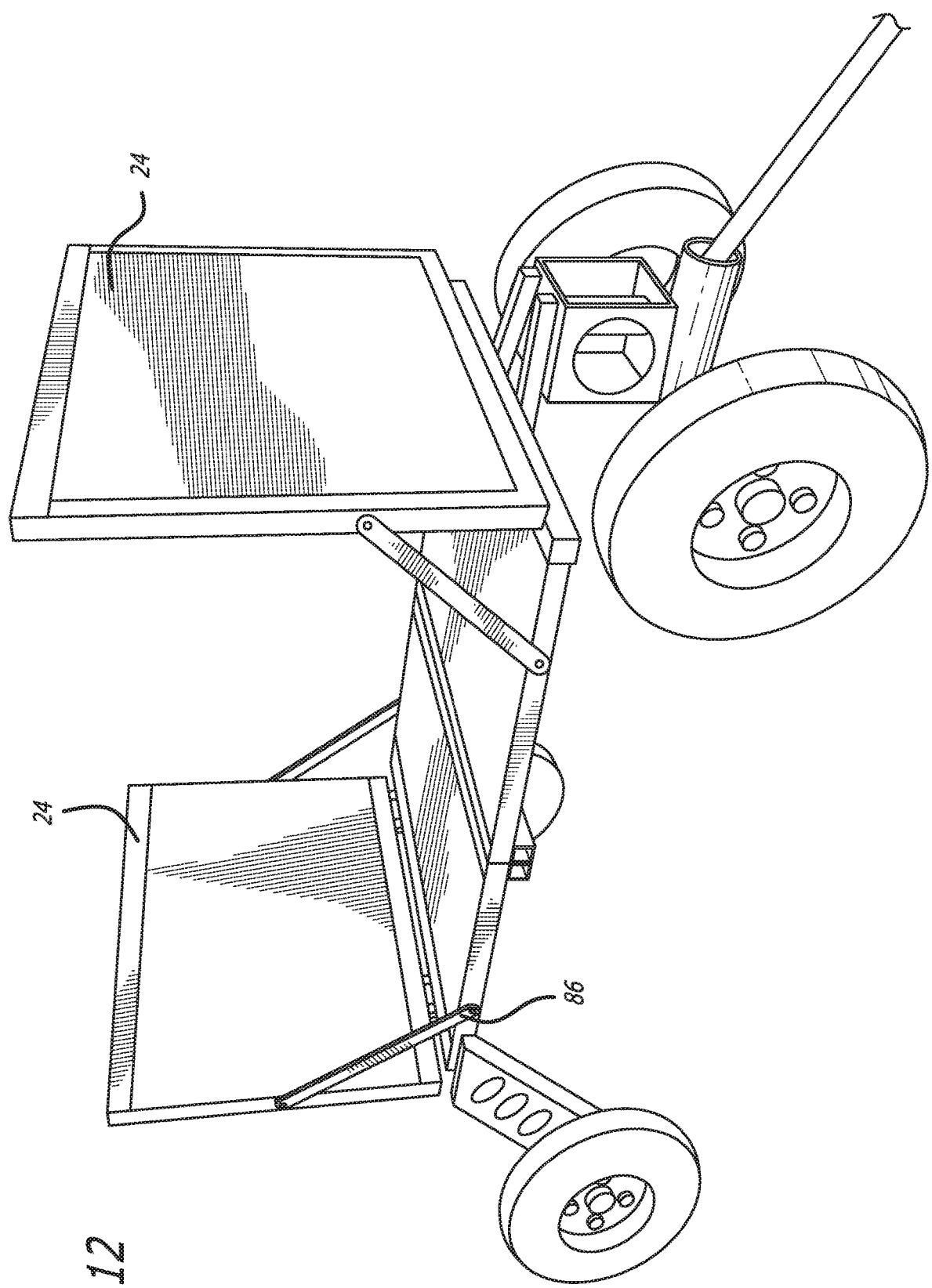
FIG. 12 provides a side view of a compactible wagon in a full unfolded configuration without sidewalls in accordance with embodiments.
Figure 13:
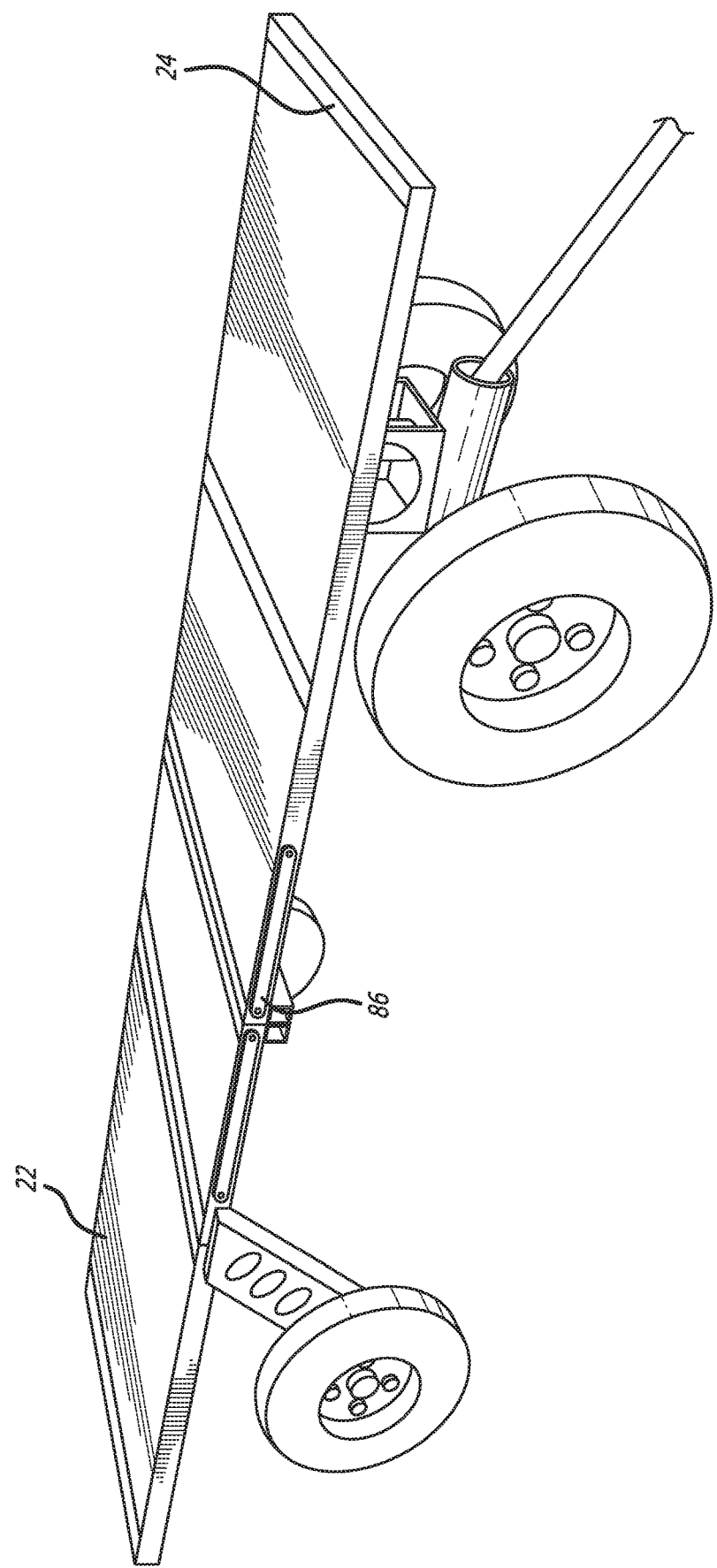
FIG. 13 provides a perspective view of a compactible wagon in a flattened configuration in accordance with embodiments.

Although many embodiments are described above in reference to FIGS. 1 to 11, other embodiments may also be contemplated. For example, as shown in FIGS. 12 and 13, in many embodiments, the front and rear support walls (22 & 24) may also incorporate a separate bracket arm (86) to support the vertical orientation of the walls and prevent their rotation relative to the wagon platform. Although two support brackets are shown in the embodiment, it should be understood that such brackets may take any suitable form (such as a removable or pivotable bracket arm) that can server to attach front and rear support walls to the wagon platform (as shown in FIG. 12). In such embodiments, the bracket arms (86) may be disengaged from the support walls (22 & 24) and pivoted such that the support walls may be folded flat (as shown in FIG. 13). In many such embodiments, the bracket arms may be hinged and or a single piece, or take any other configuration suitable to disengagably support the support walls of the wagon. In various other embodiments the wagon may include attachment points to hold the bracket arms when they are not in supportive arrangement with the wagon, as also shown in FIG. 13.

Figure 14:
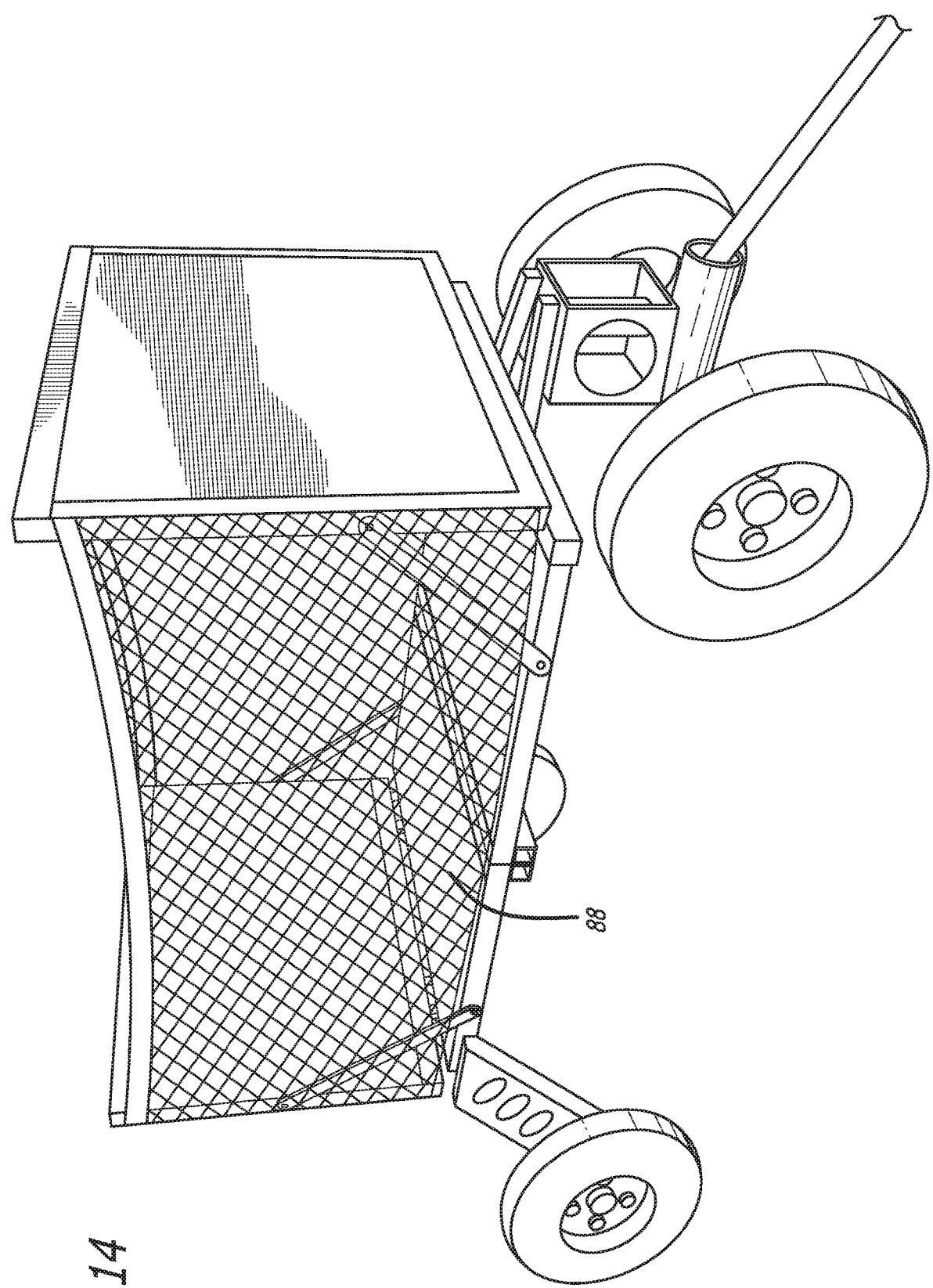
FIG. 14 provides a side view of a compactible wagon in a full unfolded configuration with net sidewalls in accordance with embodiments.
Figure 15:
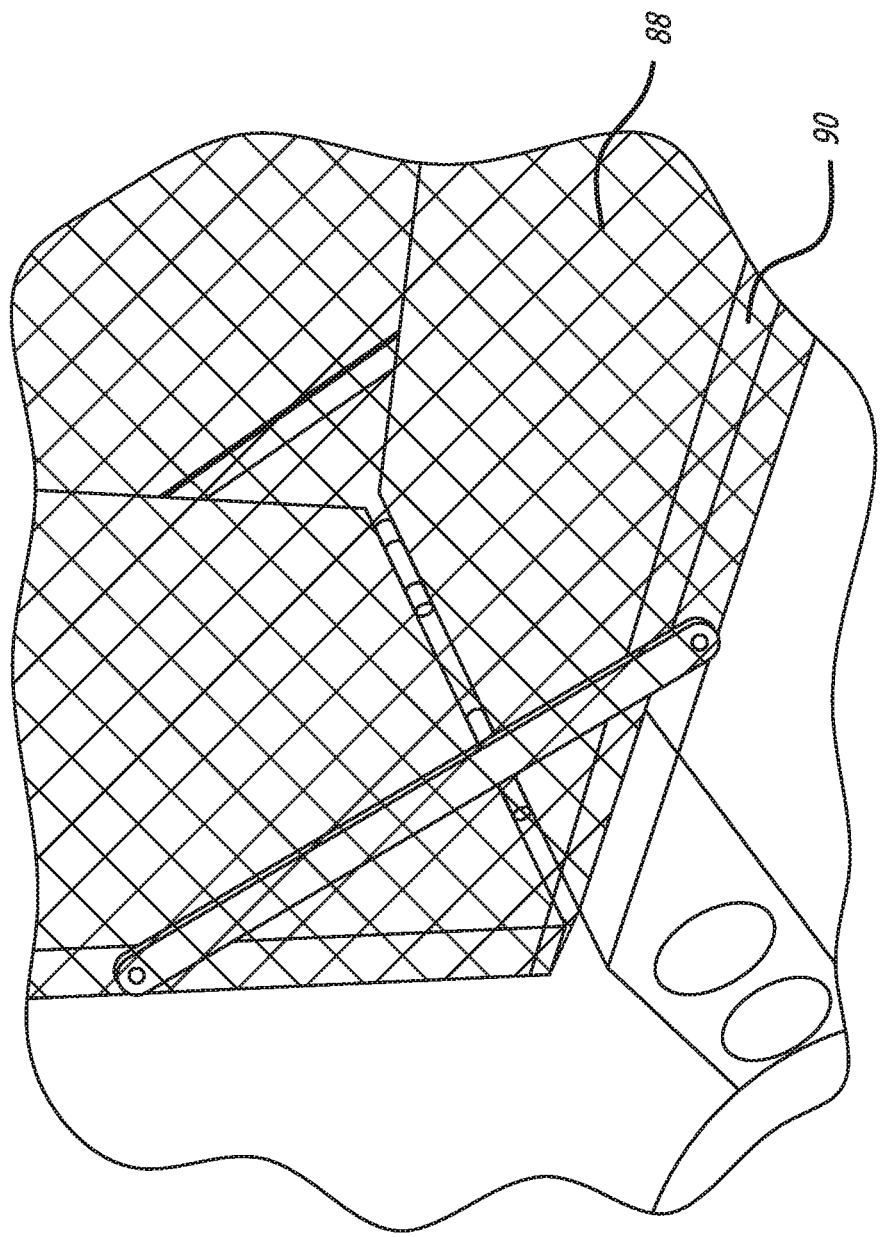
FIG. 15 provides a close-up view of a rear-wall support for a compactible wagon in a full unfolded configuration in accordance with embodiments.
Figure 16:
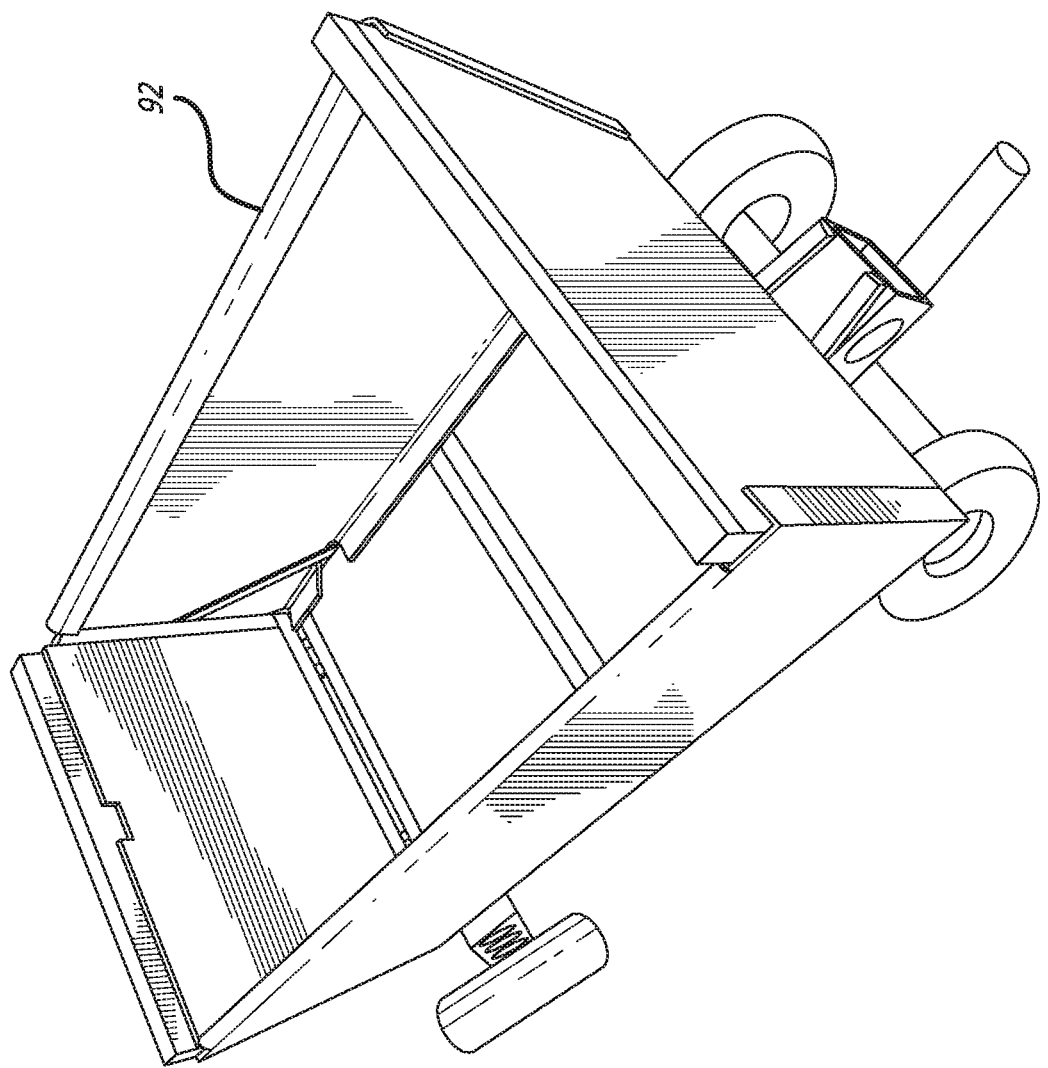
FIG. 16 provides a perspective view of a compactible wagon with both sets of sidewalls closed in accordance with embodiments.
Figure 17:
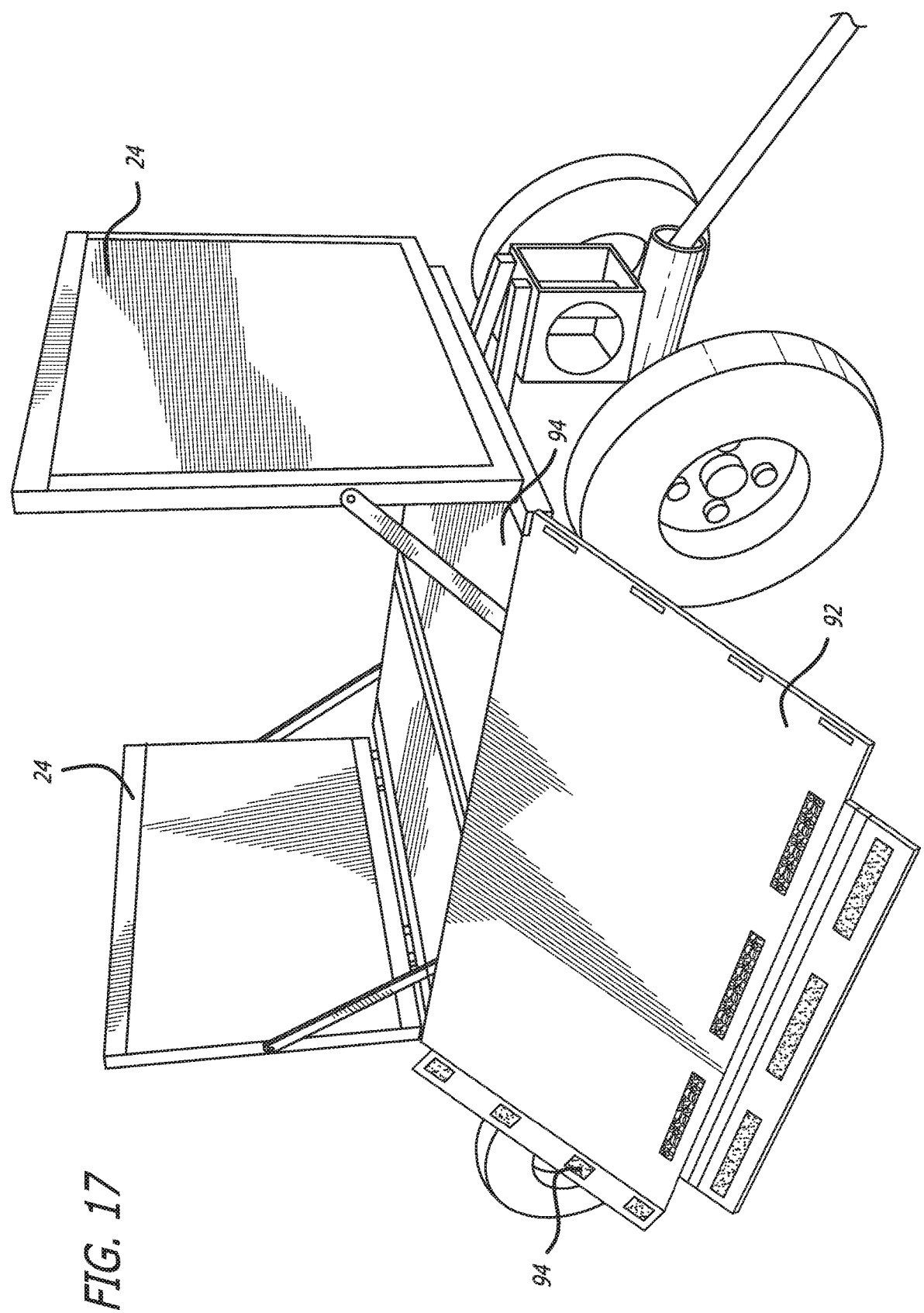
FIG. 17 provides a perspective view of a compactible wagon with both sets of sidewalls opened in accordance with embodiments.

In embodiments incorporating such bracket arms, the sidewalls do not need to provide support to the front and rear sidewalls. As a result many different sidewall structures may be incorporated into the compactible wagon, including non-structural forms, such as, for example, net or cloth walls (88) such as those shown in FIGS. 14 and 15. In such embodiments, the net or cloth walls may be interconnected with the walls and platform of the wagon via fasteners (90), such as, for example, snaps, buttons, zippers or hook & latch fasteners Alternatively, as shown in FIGS. 16 and 17, the walls may include detachable or hinged hard walls (92) that can be either removed from the sides of the wagon or pivoted flat against the base of the wagon. In various embodiments, as shown, such hard walls may be detachably attached to the wagon via fasteners (94), such as, for example, snaps, buttons, zippers or hook & latch fasteners.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A compactible wagon comprising:
   a platform having first and second ends and upper and lower surfaces and defining a platform width, a platform length and a longitudinal axis at either end of which are disposed the first and second ends of the platform, and where the platform is further comprised of at least two pivotably interconnected independent sections, at least one section being disposed proximal the first end and at least one section being disposed proximal the second end;
   at least two sets of wheels, each of the at least two sets of wheels being disposed below the lower surface of the platform, at least one set being disposed on a bottom surface of each of at least the two independent sections proximal the first and second ends, and each set of wheels comprising at least one wheel;
   wherein the independent sections of the platform are pivotable about a horizontal axis arranged perpendicular to the longitudinal axis between an unfolded position and a folded position, where in the unfolded position all of the independent sections form a platform having a horizontally planar configuration, and wherein in a folded position the independent sections are disposed vertically adjacent one another and concomitantly the at least two sets of wheels remain located below the folded platform and are drawn closer together such that at least one set of wheels partially overlaps the other set of wheels along a single axis, and wherein in the horizontally planar configuration the platform of the compactible wagon is substantially flat.

2. The compactible wagon of claim 1, wherein the independent sections of the platform are pivotably interconnected at the midpoint of the platform length.

3. The compactible wagon of claim 1, wherein the two sets of wheels overlap when the platform is disposed in the folded position.

4. The compactible wagon of claim 1, wherein at least one set of wheels is rotatable about a vertical axis perpendicular to the longitudinal axis of the platform.

5. The compactible wagon of claim 4, further comprising a handle interconnected to the at least one set of wheels that is rotatable about the vertical axis.

6. The compactible wagon of claim 1, further comprising a least a third and a fourth independent section, wherein the at least third independent section is pivotably interconnected with the first end of the platform and the at least fourth independent section is pivotably interconnected with the second end such that the platform length is extended on the first and second end the length of each of the at least third and fourth independent sections.

7. The compactible wagon of claim 6, further comprising at least one support element disposed at the first and second ends of the platform such that the third and fourth independent sections are supported in a horizontal plane that is the same as the horizontal plane of the platform and are prevented from rotating beyond the horizontal plane of the platform.

8. The compactible wagon of claim 6, wherein the third and fourth independent sections are configurable to pivot to a vertical position such that they rotate about a horizontal axis that is perpendicular to the longitudinal axis of the platform.

9. The compactible wagon of claim 6, further comprising at least two support brackets rotatably connected to the sides of the platform and configured to connect to each of the third and fourth independent sections such the support brackets provide a rigid support element for each of the third and fourth independent sections while in the vertical position.

10. The compactible wagon of claim 9, wherein each of the at least two support brackets are disconnectable from the each of the third and fourth independent sections and secured in line with the horizontal plane of the platform.

11. The compactible wagon of claim 1, further comprising at least two sidewalls rotatably connected to the platform and configured to span longitudinally along the length of the platform and wherein the at least two side walls can be rotated to a vertical position to form a partially enclosed volume above the platform, the sidewalls being further configured to fold such that in a compacted position no dimension of each of the sidewalls is greater than the width of the platform.

12. A compactible wagon comprising:
a platform having first and second ends and upper and lower surfaces and defining a platform width, a platform length and a longitudinal axis at either end of which are disposed the first and second ends of the platform, and where the platform is further comprised of at least two pivotably interconnected independent sections, at least one section being disposed proximal the first end and at least one section being disposed proximal the second end;
at least two sets of wheels, each of the at least two sets of wheels being disposed below the lower surface of the platform, at least one set being disposed on a bottom surface of each of at least the two independent sections proximal the first and second ends, and each set of wheels comprising at least one wheel;
wherein the independent sections of the platform are pivotable about a horizontal axis arranged perpendicular to the longitudinal axis between an unfolded position and a folded position, where in the unfolded position all of the independent sections form a platform having a horizontally planar configuration, and wherein in a folded position the independent sections are disposed vertically adjacent one another and concomitantly the at least two sets of wheels remain located below the folded platform and are drawn closer together such that at least one set of wheels partially overlaps the other set of wheels when viewed from the side, and wherein in the horizontally planar configuration the platform of the compactible wagon is substantially flat; and
a least a third and a fourth independent section, wherein the at least third independent section is pivotably interconnected with the first end of the platform and the at least fourth independent section is pivotably interconnected with the second end such that the platform length is extended on the first and second end the length of each of the at least third and fourth independent sections.

* * * * *